C. O. GUERNSEY.
Fanning Mill.
No. 3,794.  Patented Oct. 12, 1844.
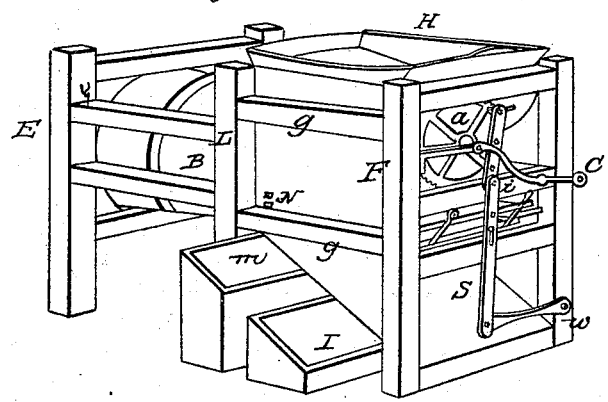
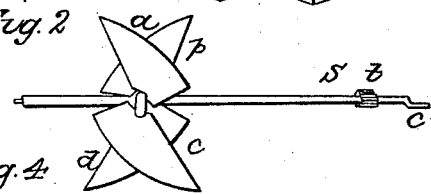
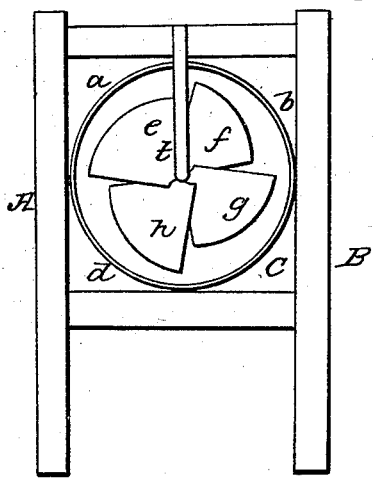
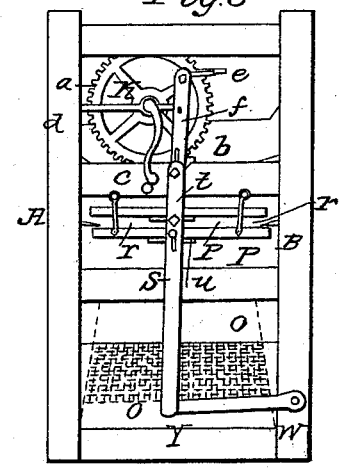

UNITED STATES PATENT OFFICE.

CALVIN O. GUERNSEY, OF RUSSIA, NEW YORK.

FANNING-MILL FOR CLEANING GRAIN.

Specification of Letters Patent No. 3,794, dated October 12, 1844.

*To all whom it may concern:*

Be it known that I, CALVIN O. GUERNSEY, of the town of Russia, in the county of Herkimer and State of New York, have invented a new and useful Improvement in Fanning Mills or Machines for Fanning and Cleaning Grain and Seeds; and I do hereby declare that the following is a full, clear, and exact description of the construction and operation of the same, reference being had to the annexed drawings, making a part of this specification, in which—

Figure 1 is a perspective view; Fig. 2 is the fan or blower; Fig. 3, is a front section or vertical view; and Fig. 4 is a rear section or vertical view.

Instead of the fan or blower ordinarily used, the blower constructed for this mill is a spiral fan, Fig. 2, which consists of the shaft $s$, with the four oblique wings $a\ b\ c\ d$ attached to it in the manner here seen; the wings being so disposed as to form an angle with the line of the shaft of about 45 degrees. It is obvious when this shaft with the wings upon it, is turned rapidly within a barrel or tube just large enough to admit its turning freely, that a current of air will be produced, passing in the direction of the line of the shaft. It is by a current of air thus produced that the grain is winnowed in this case. This shaft occupies the entire length of the mill from end to end, lying horizontally. The wings, or fan being within the barrel B, Fig. 1, and the shaft is turned in that direction which carries the current of air out at the rear end of the mill, or in the direction B E. The current of air which winnows the grain, strikes it as it approaches the fan, and not after it leaves it, as in ordinary cases. Fig. 4 shows the rear end of this fan, lying within the barrel before mentioned, the end of which barrel is here seen at $a\ b\ c\ d$. The wings of the fan $e\ f\ g\ h$ are fixed to the shaft, lying obliquely across it about 14 or 15 inches from its rear end. This end turns in a bearing fitted in the lower end of the hanger $t$, which holds it in a position exactly central to the barrel $a\ b\ c\ d$. This fan shaft has upon it, near the front end, the small pinion $t$, Fig. 2, of 3 inches diameter, and at the end and outside of the bearing is the crank $c$, which makes a sweep of about the same diameter. The fan is turned and the whole mill moved by a crank which turns a wheel of 12 inches diameter, so placed as to match with and turn this pinion. This wheel and crank are seen at $a\ b\ c$ Fig. 3; the pinion being here hid behind other parts of the machinery, at $b$, but is seen on the shaft at $t$ Fig. 2. The wheel and crank are also seen at the front of the mill in Fig. 1, at $a\ c$. The upright pieces $f$ and $s$, Figs. 1, and 3, are levers or rods, through which the proper motion is communicated to the shoe, or drip-board of the hopper, and to the sieves. This is done by hanging both these levers on the crank $c$ Fig. 2 as seen at $b$, Fig. 3, and at $i$ Fig. 1. The lever $s$, has a joint at the elbow $v$ Fig. 3, where it is connected with the arm $v\ w$, which is hung loosely on a pin in the post of the mill frame at $w$.

$o\ o$ Fig. 3 is the screen of the mill which is similar to that in other fanning mills, except that it is stationary.

P P are two sieves a coarse and a fine one, or such as may be required; the edges of their frames only are seen here. These as well as the screen are similar to the sieves and screens of other mills, except that the sieves are longer than those in other mills from front to rear, and the screen is stationary. These sieves are attached to the lever $s$ by iron rods fastened to their frames, and which pass loosely through the lever and are secured by nuts and screws on the outer ends of these rods as seen at $t$ and $u$. The upper one, or that at $t$ passing an aperture in the lever, fitted loosely to it, permitting it to move easily therein; and the lower one, passing loosely through a slot, or oblong orifice, so that the rotatory motion of the crank at the upper end of this lever carries the lower sieve, which is also hung on the swinging wires $r$ and $r$, from side to side in proportion to the sweep of the crank, without giving it a vertical motion, while the upper sieve, or that fixed to the lever at $t$, partakes of the rotatory motion of the crank and moves up and down, as well as from side to side, agitating the grain and chaff as it falls from the hopper, in an advantageous manner for the action of the air, which is continually passing through it from front to rear.

The office of the lever $f$, is to agitate the shoe or drip-board forming the bottom of the hopper so as to shake down the grain, and chaff in a suitable manner upon the sieves. This shoe, or drip-board at the bottom of the hopper is hung at the rear end the same as in other fanning mills. The lever is hung in the center to a pin in the frame work that supports the wheel before mentioned, as seen at $f$, in such a manner as to work easily on this pin. At the upper end it is fitted in like manner loosely to a rod which is fastened to the shoe of the hopper, and passing through the inclosure which surrounds the hopper by a long mortise $e$ which allows it to move from side to side, is bent in such a way as to pass around the edge of the wheel so as not to interfere with it, and terminates as beforementioned by its shank being loosely fitted in a hole in the upper end of the lever $f$. The orifice by which this lever is attached to the crank on the main shaft, seen at $b$ Fig. 3, is like that before described in the other lever, by which the lower sieve is moved, of an oblong shape, corresponding in length to the diameter of the circle described by the crank; so that a horizontal motion is given to the shoe or drip-board of the hopper. It will be seen by an inspection of the figure, that all the necessary motions are at once communicated to the shoe of the hopper, and to each of the sieves, through the agency of these perpendicular levers; by their being attached to the crank on the shaft of the spiral fan, while that is moved by the hand applied to the crank C. The wheel $a$ $b$ is the prime mover. It rests on the brace $k$ which is bolted to the frame of the mill at $d$ and forming an angle behind the lever $f$, stands by its other leg on the girth $g$ forming a part of the gudgeon box at $b$ in which the bearing of the fan shaft turns. The bar $k$ of this brace is wide and flat in a horizontal direction, making a bearing for the shaft of the wheel, of such length as is a sufficient support without any bearing at the opposite end. The proportion between this wheel, and the small pinion driven by it on the fan shaft is, as four to one, the former being 12 and the latter 3 inches, being about the same as the wheel and pinion used in the common fanning mill. The frame of the mill is suited to the machinery here described, and is distinctly shown in the different drawings hereto annexed. The upright posts are about 3 feet 11 inches in length. The whole horizontal length of the mill is 4 feet. The width in front, from A to B Fig. 3 two feet four inches. In rear from A to B Fig. 4, two feet seven inches. This difference in the width of the mill at the two ends is occasioned by the expansion of the barrel B Fig. 1, at its outer end; its diameter being 3 inches greater there than at its inner end. The barrel is 25 inches in length, and its diameter at its inner end is 2 feet, at its outer end 2 feet 3 inches, lying horizontally.

The frame of the mill from F to L is square the girths $g$ $g$ Fig. 1 being twenty-five inches in length, and the width in front, and height of posts as before described. The increase in width is from L to E, to suit the expansion of the barrel B.

The hopper H Fig. 1 is similar to that of other mills; and the hanging of the sieves at the rear, or inner ends, is, like that in other mills, by swinging wires at the corners passing through the sides of the mill and nutted on the outside, as seen at N Fig. 1.

The screen $o$ $o$ Fig. 3 is not shaken as in other mills, when the mill is in motion, but remains stationary forming about the same declivity on its surface as those in other mills. The boxes $l$ and $m$ Fig. 1 shown here partly drawn out are shoved in at the side of the mill. The former passing directly under the screen, catching the screenings from the grain; and the latter catching such heavy substances, as may fall at the rear end of the sieves, and back of the drip-board attached to the back side of the screen.

The length of the horizontal lever from $v$ to $w$ Fig. 3 is about 11 inches. That of the lever $s$ about 2 feet 4 inches, and the lever $f$ about 13 inches.

The main body of the mill from F to L Fig. 1 being inclosed and the spaces around the rear end of the barrel B, being also inclosed, and no air being suffered to enter the barrel B except it comes through the front of the mill.

The current produced by the rapid motion of the spiral fan within the barrel B, creates a swift current through that part of the mill occupied by the falling grain, and the agitated sieves, carrying the chaff, and dust, through the barrel B, and out at the rear end E of the mill. It will therefore be seen that by this arrangement, the falling grain is exposed to the action of a current of air seeking its way through the mill from the time it falls from the hopper, till it reaches the screen, and that this current is strongest where it is most wanted immediately about the sieves, where the grain and chaff are suitably agitated by the peculiar motion given to the sieves. In this manner, a larger quantity of grain is cleaned in a given time, and it is done in a more perfect manner than by the mills now in use; and by the gentle and uniform current, which this mill by slow turning is capable of preserving, grass seed, and other fine seeds may be cleaned, which it is hardly possible to do by the mills now in use.

What I claim as my invention and desire to secure by Letters Patent is—

The mode here described of agitating the sieves by the use of the lever S, and the hopper bottom, by the use of the lever $f$, both being attached to and moved by the crank C, Fig. 2; the upper sieve partaking of the rotatory motion of the crank, and the lower sieve having a horizontal motion only. The whole being so arranged as to expose the falling grains or seed to a current of air from the time it falls from the hopper till it reaches the screen.

CALVIN O. GUERNSEY.

Witnesses:
 WILLIAM BAKER,
 MAYNARD BAKER.